(12) United States Patent
Ma et al.

(10) Patent No.: US 6,540,808 B2
(45) Date of Patent: Apr. 1, 2003

(54) CONTROLLED RELEASE FERTILIZERS BASED ON SELF-ASSEMBLED MOLECULE COATINGS

(75) Inventors: Zhongxin Ryan Ma, Ridgeland, MS (US); Donald R. Thomas, Jackson, MS (US); Corinne G. Ciaccio, Jackson, MS (US)

(73) Assignee: Mississippi Chemical Corporation, Yazoo City, MS (US)

( * ) Notice: Subject to any disclaimer, the term of this patent is extended or adjusted under 35 U.S.C. 154(b) by 0 days.

(21) Appl. No.: 09/827,901

(22) Filed: Apr. 9, 2001

(65) Prior Publication Data

US 2002/0144528 A1 Oct. 10, 2002

(51) Int. Cl.[7] ................................................. C05G 5/00
(52) U.S. Cl. .................. 71/27; 71/30; 71/31; 71/32; 71/54; 71/61; 71/63; 71/64.07; 71/64.11
(58) Field of Search ................................ 71/27, 30, 31, 71/32, 54, 61, 63, 64.11, 64.13, 64.07

(56) References Cited

U.S. PATENT DOCUMENTS

| | | | | |
|---|---|---|---|---|
| 3,259,482 A | * | 7/1966 | Hansen | 71/64 |
| 5,310,785 A | * | 5/1994 | Hayakawa et al. | 525/7 |
| 6,176,891 B1 | * | 1/2001 | Komoriya et al. | 71/11 |
| 6,287,359 B1 | * | 9/2001 | Erhardt et al. | 71/64.07 |
| 6,322,979 B1 | | 11/2001 | Bamdad et al. | 435/6 |
| 6,358,296 B1 | * | 3/2002 | Markusch et al. | 71/64.07 |
| 6,364,925 B1 | * | 4/2002 | Markusch et al. | 71/64.07 |

OTHER PUBLICATIONS

"Biomolecular Self–Assembling Materials: Scientific and Technological Frontiers", © 1996 by the National Academy of Sciences.

* cited by examiner

Primary Examiner—Chhaya D. Sayala
(74) Attorney, Agent, or Firm—Oblon, Spivak, McClelland, Maier & Neustadt, P.C.

(57) ABSTRACT

Controlled release fertilizers are provided and methods for their preparation, wherein the controlled release fertilizers are obtained through self-assembling molecules on the surfaces of the fertilizer particles, and then, preferably, linking these molecules into a network with another component. The designed molecules have a hydrophilic portion, which can interact with fertilizers, and a hydrophobic portion that make the molecule self-assemble and setup a moisture barrier. The molecules also preferably have at least two functional groups in order to form a network.

45 Claims, 4 Drawing Sheets

CONTROLLED RELEASE FERTILIZERS BASED ON SELF-ASSEMBLED MOLECULE COATINGS

FIELD OF THE INVENTION

The present invention relates to controlled release plant nutrients and crop protection compositions and particularly, to fertilizers showing a release in a certain period of time, and to a method for producing controlled release compositions.

DISCUSSION OF THE BACKGROUND

Encapsulations and coats of plant nutrients are the major methods for providing controlled release nutrients. Water-soluble nutrients encapsulated in water insoluble coatings are released at controlled rates. Sulfur coated fertilizers are widely used for controlled release purposes as disclosed in U.S. Pat. No. 3,342,577.

Polymer encapsulation is another popular method to make controlled release fertilizers (CRF). Examples of these polymer encapsulation methods are found in U.S. Pat. No. 4,657,576 (use of a dicyclopentadiene based resin to encapsulate water-soluble fertilizers); U.S. Pat. Nos. 6,039,781; 4,711,659, 4,804,403, and 4,969,947 (urethane based coatings of fertilizers); U.S. Pat. Nos. 5,851,251 and 6,001,147 (urea and urethane based fertilizer coatings); and U.S. Pat. No. 5,803,946 and European patent 1,043,295 A2 (interpenetrating polymer coating process that includes urethane with other resins). In order to overcome the shortcomings of sulfur coatings, processes using additional layers of polymer coatings are disclosed in U.S. Pat. Nos. 5,219,465 and 5,466,274. The use of a wax as a sealant for sulfur coated urea is disclosed in U.S. Pat. No. 5,478,375. A polymeric coating process based on sulfonated ethylene-propylene-diene terpolymers is disclosed in U.S. Pat. No. 5,429,654. An epoxy resin based coating is disclosed in U.S. Pat. No. 5,698,002.

While the above noted efforts provide promise, there is still a need in the industry for inexpensive and high quality CRFs to expand the application of these fertilizers.

SUMMARY OF THE INVENTION

Accordingly, one object of the present invention is to provide controlled release fertilizers coated with organic or organic/inorganic composite materials.

Another object of this invention is to provide controlled release fertilizer products that have high resistance to attrition during handling and applications.

Another object of the invention is to provide a method to produce such controlled release fertilizer products economically and practically.

These and other objects have been satisfied by the discovery of a method for coating fertilizers to provide controlled release properties comprising forming a self assembly of amphiphilic molecules having a hydrophilic portion and a hydrophobic portion, wherein the hydrophilic portion is proximal relative to the fertilizer and the hydrophobic portion is distal to the fertilizer, the self assembly forming a multilayer that provides a hydrophobic barrier to block water vapor and water from contacting the fertilizer.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
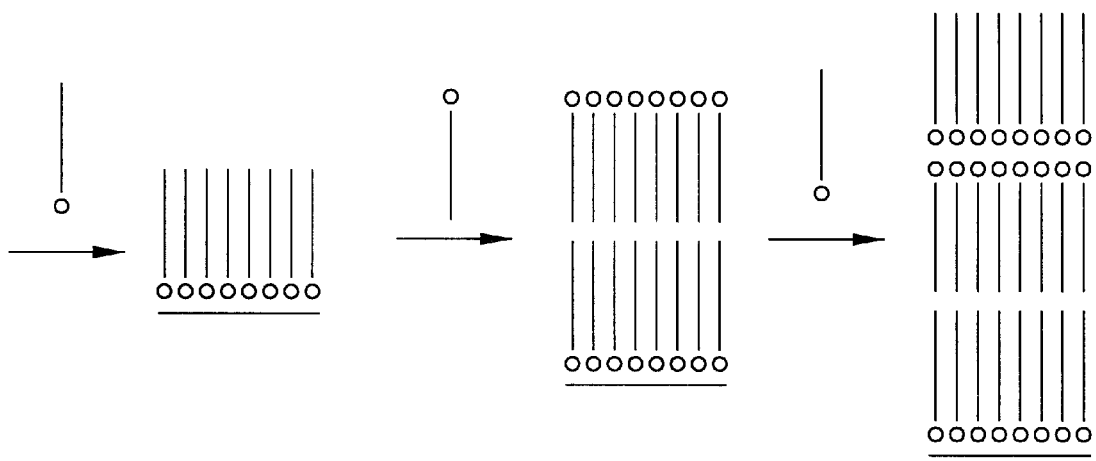
FIG. 1 is a graphical representation of amphiphilic molecules of the present invention self-assembling on the hydrophilic surface.

The present invention relates to a controlled release fertilizer and method for its production, wherein the CRF comprises a nutrient core and a coating prepared from amphiphilic molecules having a hydrophilic portion and a hydrophobic portion. These amphiphilic molecules are designed so that the hydrophilic portion of the molecules can strongly interact with the nutrient core to increase the adhesion of the coating to the nutrient particles. The molecules are also preferably multifunctional so that they can be connected to form networks on the fertilizer surfaces. After sufficient energy is provided, the molecules can self-assemble to form multi-layers. The hydrophilic portion of the molecules interacts with the fertilizer surfaces or themselves by hydrogen bonding or hydrophilic affinity. Additionally the molecules have large hydrophobic portions so that the coatings formed will be hydrophobic barriers to block the water vapor and water away from contacting the fertilizer.

The amphiphilic molecules used to prepare the coatings of the present invention can be any amphiphilic molecule capable of interacting with the surface of a nutrient fertilizer core, while simultaneously providing a barrier layer to water penetration into that nutrient core. Preferably, the amphiphilic molecules are prepared from long carbon chain molecules having from 5 to 30 carbons, more preferably from 8 to 22 carbons, having functionality on at least one end that can interact with the nutrient core, or can be converted into a functional group that will interact with the nutrient core. In these long chain carbon based amphiphilic molecules, one or more carbons in the backbone can be optionally replaced with one or more different heteroatoms, preferably O, S or N. More preferably these amphiphilic molecules are conveniently and inexpensively made from fatty acids. The fatty acids and their derivatives are readily converted using conventional organic chemistry techniques and reactions, to provide reactive group amido-amines as hydrophilic parts, while the saturated or unsaturated long chains serve as hydrophobic parts. In the resulting amphiphilic molecule-derived self assembled layer, the amino groups can be connected with polyisocyanates or other crosslinking agents, while the conjugated or unconjugated double bonds can be reacted under radical conditions to form interconnected networks.

Optionally, the coating materials can contain one or more additional reactive components that can react with either the amphiphilic molecules or with added crosslinking agents, or both. Suitable additional reactive components include, but are not limited to, polyols, polyamines, styrenes, acrylates and methacrylates. The compositions also can contain one or more catalysts, which can be radical initiators, such as azo compounds, or peroxides; one or more inorganic drying agents, such as manganese or cobalt salts. Trialkylamines and organic tin compounds can also be used to accelerate the urethane reactions. The reactions can be run neat (without solvent) or in the presence of solvent.

The amphiphilic molecules are present in the coating materials in an amount sufficient to provide a self assembly around the nutrient particle. Preferably, the amphiphilic molecules are present in an amount of from 5 to 100 wt % of the coating materials (exclusive of catalysts), more preferably from 20 to 100 wt %. The one or more additional reactive components are present in an amount of from 0 wt % to 80 wt % of the coating materials (exclusive of catalysts), more preferably from 0 to 60 wt %. The catalysts are used in amounts sufficient to provide reasonable rates of reaction, preferably from 0 to 10 wt % for the radical initiator catalysts, and from 0 to 10 wt % for urethane reaction accelerators. Drying agents can also be present in amounts from 0 to 20 wt % if desired.

The nutrient particles can be coated using a coating drum, a fluidized bed, or other vessels, in which the nutrient fertilizer particles can be mobilized to tumble or roll to provide all of the surface of the particles with a chance to be exposed to the coating materials. The coating processes are carried out at temperatures from 40 to 100° C., preferably 50 to 90° C., more preferably from 60 to 80° C. The coating process is performed for a period of time sufficient to adequately coat substantially all of the particle surface, preferably from 1 to 30 min, more preferably from 5 to 20 min. Within the context of the present invention, the term "substantially all of the particle surface" indicates that the coating covers a sufficient portion of the surface to provide the desired controlled release rate. Preferably the portion covered is at least 90% of the surface area, more preferably at least 95%, most preferably complete coverage. Also included in such coatings are embodiments wherein the coating has gaps in coverage of the surface that are small relative to the size of the amphiphilic molecules (or "holes" in the coating).

In addition to the coating made from the present amphiphilic molecules, the CRFs can further contain additional coating layers either before the application of the amphiphilic molecule coating or after application of the amphiphilic molecule layer. Accordingly, the CRF's can be a single-layer coated or multi-layer coated fertilizer, or also can be a fertilizer coated with a combination of self-assembling molecules (SAM) based material with other kinds of coatings.

Figure 2:
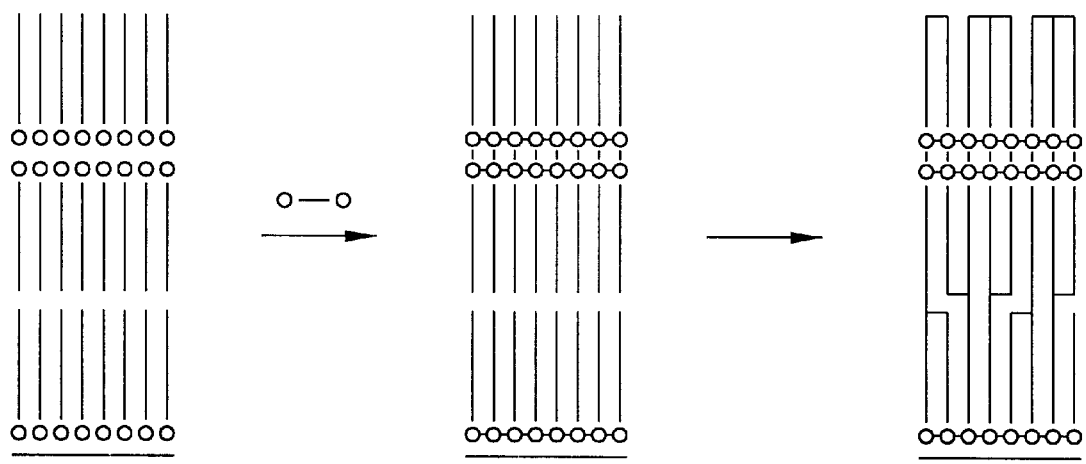
FIG. 2 is a graphical representation of crosslinking of the self-assembled amphiphilic molecules of the present invention.

A series of amphiphilic molecules can be included in the present invention. The molecules preferably have size from 0.5 to 3 nm long. This will permit the molecules to move and rearrange if enough energy is provided. At one end of the molecules, there are reactive, hydrophilic groups, which can interact with surface of nutrients via hydrogen bonding or static electric interactions. At the same time, if desired, the reactive functions can be connected with a cross linker. At the other end of the molecules, there are hydrophobic portions, which can interact with the hydrophobic parts of other molecules. This part also includes some reactive functions, so that, additional networks can be formed if desired, such as by crosslinking through radical reactions of double bonds. FIG. 1 demonstrates how the amphiphilic molecules self-assemble on the hydrophilic surface by hydrophilic portion interacting with hydrophilic portion and hydrophobic portion interacting with hydrophobic portion. FIG. 2 shows how the molecules can be cross-linked in the preferred two stage curing process.

Fatty acids and their derivatives, preferably unsaturated fatty acids and derivatives thereof, are preferred inexpensive sources of starting materials used to make the self-assembling amphiphilic molecules used in the present coatings. Glycerol esters are among the cheapest derivatives available and are thus more preferred. The glycerol esters most preferred are those made from soybean oil, tung oil, linseed oil, castor oil, tall oil, sunflower oil and other natural oils. Other esters are also good materials to start with, including, but not limited to, ethyl linoleate, ethyl linolenate, ethyl pinolenate, ethyl eleostearate, ethyl ricinoleate, and ethyl oleate. In a preferred embodiment, these oils, esters or acids are reacted with amines to form functional amides or with a multifunctional alcohol to form a functional ester. Suitable amines include, but are not limited to, polyamines and hydroxyl-amines. Suitable multifunctional alcohols include, but are not limited to pentaerythyritol, glycerols and other polyols, such as polymeric polyols. Thus, the molecules produced have hydrophilic terminal groups that are amido, amino, and/or hydroxyl groups. More preferred embodiments of suitable amines include but are not limited to, ethyleneamines, including ethylenediamine, diethylenetriamine, triethylenetetraamine, tetraethylenepentaamine, pentaethylenehexaamine; hydroxylamines, including ethanolamine, diethnolamine, propanolamime, dipropanolamine; and other polyamines and hydroxylamines. The acids and derivatives thereof and the various amines can be used singly or can be used in combinations of two or more thereof. The only limitation to using more than one type of amphiphilic molecule is that any combination of amphiphilic molecules must still be able to form the self assembly coating, even with the two or more different amphiphilic molecules in close proximity and interaction with one another. Otherwise there are no limitations as to the number of different species that can be combined into a single coating.

Figure 3:
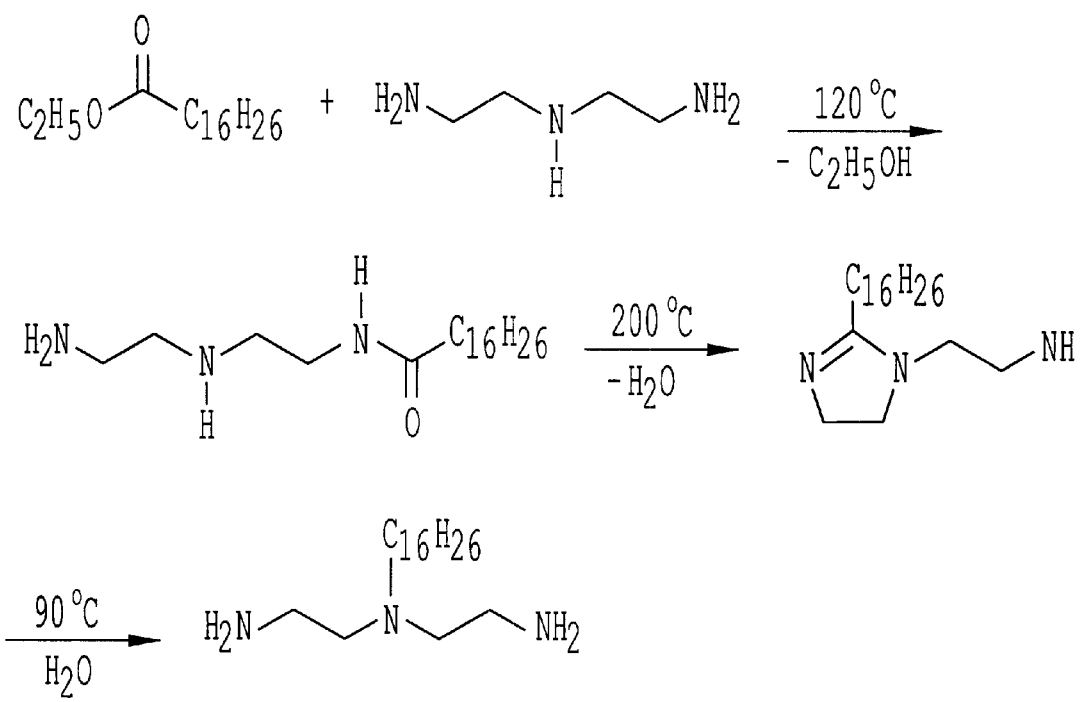
FIG. 3 shows an example of the synthesis of a preferred embodiment of amphiphilic molecule of the present invention.

The process of making the self-assembling amphiphilic molecules (SAM) is preferably an amidation reaction. This reaction is preferably carried out in a reaction vessel at temperatures from 70 to 20° C. with or without a catalyst, such as a trialkylamine. For non-conjugated fatty acids, a catalyst, for example, iodine, is added to convert them to conjugated unsaturated fatty amides and to increase their reactivities. This invention includes both non-conjugated and conjugated unsaturated fatty amides. When the starting material is a glycerol ester, the by-product glycerol can be removed by vacuum distillation. However, the present invention includes both distillated and non-distillated processes. For reaction with a polyamine, an imidazole intermediates is produced in order to obtain the terminal amino amide. This process is illustrated in the production of N,N-bisaminoethyl α-eleostearamide from ethyl α-eleostearate as shown in FIG. 3. This preferred embodiment of the present process and its product provides significantly improved properties of SAMs. However, the present invention is not limited to amides in which the amino groups are terminal amino groups, but also includes amides having amino groups at other locations within the molecule. Additionally, the present invention is not limited specifically to amides, but can include other reactive functional groups, such as esters, that provide hydrogen bonding or hydrophilic interaction with the surface of the nutrient particles.

According to the present invention, the controlled release fertilizer products include a nutrient core. The nutrient core can be any conventional fertilizer nutrient, including, but not limited to, one or more primary nutrients, one or more secondary nutrients and/or one or more micro nutrients. Suitable primary nutrients include, but are not limited to, N, P, K or combination products thereof. Suitable secondary nutrients include but are not limited to, calcium, magnesium and sulfur. Suitable micro nutrients include, but are not limited to, boron copper, iron, manganese, molybdenum and zinc. The nutrients can be in any coatable form, preferably in the form of granules or prills or other solid forms of particles. It is preferred that the surfaces of the nutrients are spherical and smooth, but due to the coating methods used and the nature of the self assembling molecules, rough, irregular particle materials can also be used if desired. Uniform particle size of the products is most preferred. A particularly preferred nutrient particle is the granular urea product sold by Mississippi Chemical Corporation.

In a preferred method for obtaining the present controlled release fertilizer product, the SAM coating materials are sprayed or ejected onto the preheated urea granules at an elevated temperature, preferably from 60–80° C. in order to coat the surface of the granules and allow the amphiphilic component self-assemble on the granular surfaces. The SAM can be directly sprayed on the nutrient alone. However, as desired and as described above, the SAM component also can be mixed with other materials, such as polyols, polyamines, polyether polyols, polyester polyols, polyester polyamines, and polyether polyamines. It also can be mixed with drying oils, such as tung oil, linseed oil, and soybean oil, and alkyl resins. After allowing the nutrient particles to roll for 1–20 minutes, the SAM will spread over the particle surface. The length of time needed for rolling the particles is merely the amount of time sufficient to allow the SAM to spread over substantially the entire particle surface. Preferably, the rolling time is from about 5 to 20 min, more preferably about 8–15 min.

Di- or tri-isocyanates are preferably used as cross-linking agents to connect the hydroxyl groups or amino groups to form urethane or urea linkages. The isocyanates used here include, but are not limited to, aromatic isocyanates, such as, toluene diisocyanate (TDI), bis(4-isocyanatophenyl) methane (MDI), and aliphatic isocyanates, such as, 1,6-hexamethylene diisocyanate (HDI), isophorone diisocyanate (IPDI), 2,2,5-trimethylhexane diisocyante (TMHDI), bis(4-isocyanatocyclohexyl) methane ($H_{12}MDI$), etc. The isocyanates also include their dimers, trimers, and other derivatives such as polymeric isocyanates and isocyanic prepolymers. These isocyanates can be applied alone, or as mixtures of two or more different isocyanates, or in combination with other additives such as organic tin catalyst and triamines. This component can be applied neat or in a solvent. The cross-linking agents are not limited to the polyisocyanates. They also can be polyvinylethers, polyacrylates, epoxy compounds, and other materials that can react with amino or hydroxyl groups.

Catalysts for crosslinking the olefin groups present in the hydrophobic portion of the amphiphilic molecules can be applied individually or mixed with one or more other components. The catalysts include, but are not limited to, peroxide and azo radical initiators, for example, benzoyl peroxide and azobisisobutyronitrile, and inorganic and organometallic drying agents such as, manganese, cobalt, zinc, zirconium and calcium salts and mixture thereof. Clay and other minerals may also be used to keep the particles free flowing, if needed.

The particles are preferably kept at 60 to 90° C. for 5 to 20 minutes, more preferably at 60 to 80° C. for 5 to 10 minutes, in order to cure the coatings on the particles and form a good film coverage.

Multiple layers of coating on the nutrient particles may be applied to control the degree of release rate. The release rate can be adjusted to any length desired, by continuing to apply layers of coating. From a practical standpoint, however, the release rate is preferably adjusted to be from about 1 to about 10 months, using from 1 to 100 layers, preferably from about 2 to about 5 months using from about 2 to about 50 layers. The SAM based coatings can be applied alone or can be combined with other coatings such as alkyd resins; drying oils and modified oils; vinyl resins, for example, poly(vinyl acetate), poly(vinyl acetal); acrylic polymers, for example, poly(methyl acrylate); polyesters, for example, poly (alkylene terephthalate); epoxy resins, for example, poly (propylene oxide); polyamides, for example polycaprolactam; and polycarbonates, for example, poly(alkylene carbonate); polyethylene and its copolymers.

The controlled release fertilizer of the present invention can comprise the SAM coated nutrient particles alone or can optionally contain other coated or non-coated fertilizers. Any conventional fertilizer can be used as the additional coated or non-coated fertilizer, including but not limited to ureas, phophorous fertilizers, potassium fertilizers, secondary nutrients and micronutrients.

Having generally described this invention, a further understanding can be obtained by reference to certain specific examples which are provided herein for purposes of illustration only and are not intended to be limiting unless otherwise specified.

EXAMPLES

Example 1

Synthesis of the Self-assembling Molecules for Coatings from Soybean Oil

Into a 1 liter three neck flask with a mechanic stirring system, 250 ml of soybean oil was charged. Then, 55 ml of triethylenetetraamine (TETA) was added, followed by addition of 0.25 g of iodine. The system was purged with argon for one hour. After the temperature in the flask reached 130° C., it was continuously stirred for 20 hours at temperature. FTIR showed that most of the esters were converted into amides. A vacuum distillation process was carried out at 200° C. at a pressure of 20 torr over three hours to remove glycerol and water. After cooling to 50° C., 8 ml of deionized water was added into the system. The system was then stirred for 24 hours at 90° C. A light yellowish, grease-like material was obtained.

Example 2

Synthesis of the Self-assembling Molecules for Coatings from Tung Oil

The process was the same as in example 1, but the soybean oil was replaced with tung oil and no iodine was added. The material obtained was deep yellow.

Examples 3–7 show the production of CRFs from SAMs and other optional components.

Example 3

Five hundred grams of granular urea was added into a 5 gallon rotary drum with flights, and heated to 75° C. for 10 minutes. Approximately 7 g of SAM component made in Example 1 was sprayed onto the tumbling particles. After the urea granules were rolled for about 20 minutes, 3 g of MDI and 0.1 g of AIBN in 20 ml of methyl acetate were sprayed onto the urea granules. After the mass was heated up to 75° C. again, the same amount of SAM was sprayed onto the mass. Then, 3 g of MDI and 0.1 g of AIBN in methyl acetate was sprayed once again. The tumbling particles were kept for an additional 20 minutes at 75° C. before cooling down.

Figure 4:
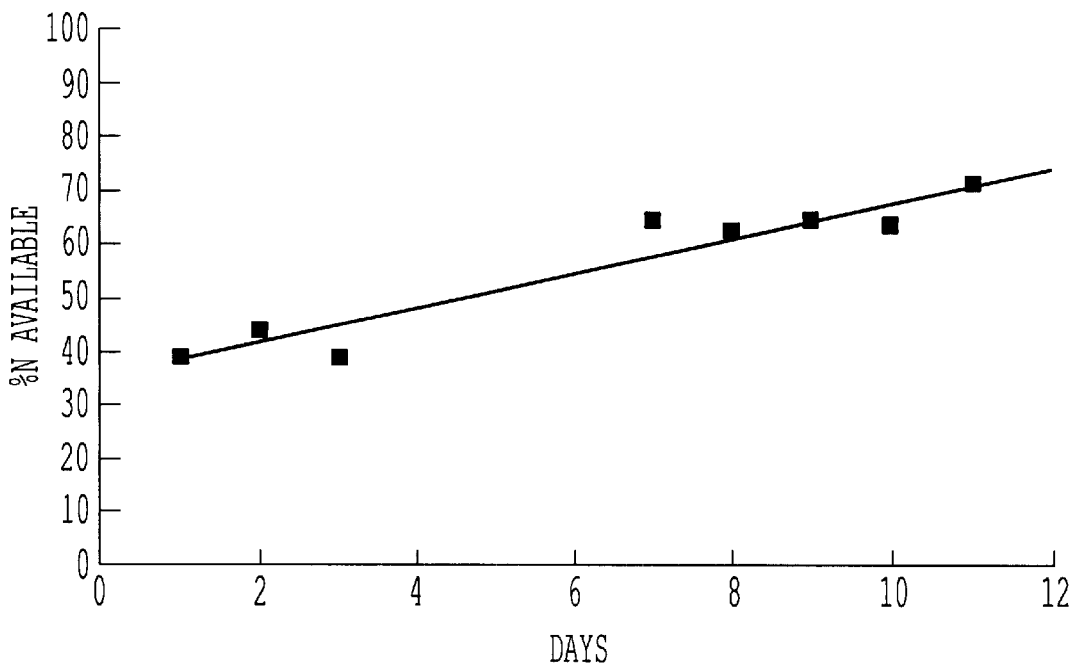
FIG. 4 is a graph of controlled release data obtained in an embodiment of the present invention.

The controlled release properties of the coated fertilizers was tested by placing 14 g of the product in a wire mesh holder, then, placing it into ajar with 300 ml of deionized water at 23° C. The jar with the product was agitated with an orbital shaker. Adequate water was taken out for elementary analysis to determine the amount of nutrient released from the product. The release pattern obtained for Example 3 is shown in FIG. 4.

Example 4

Figure 5:
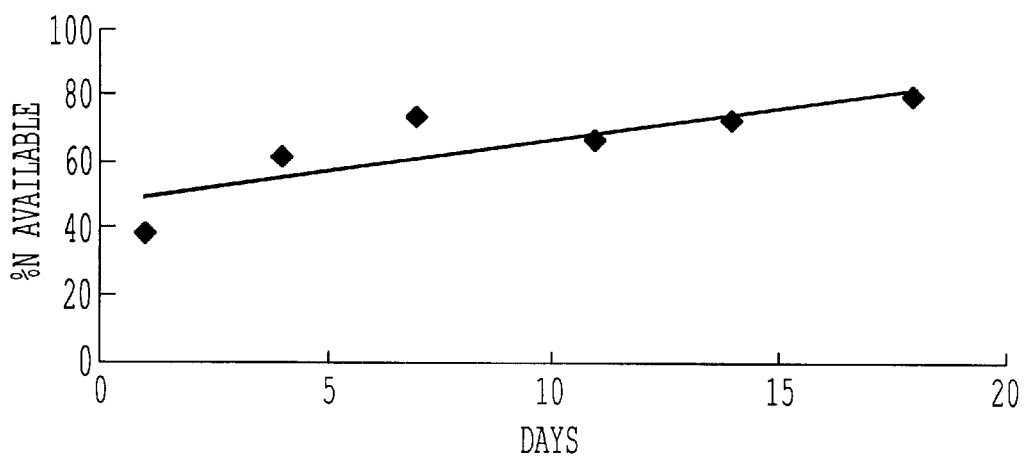
FIG. 5 is a graph of controlled release data obtained in a further embodiment of the present invention.

Five hundred grams of granular urea was added into a 5 gallon rotary drum with flights, and heated to 75° C. for 10 minutes. On to the tumbling particles, a melted mixture of 10 g of SAM component made from Example 1 and 1 g of polypropylene glycol was sprayed. After the urea granules were rolled for about 20 minutes, 5.6 g of MDI and 0.15 g of AIBN in 20 ml of methyl acetate were sprayed onto the granules. After the mass was heated up to 75° C. again, the same coating process was repeated for two times. The release pattern obtained, measured using the same procedure described in Example 3, is shown in FIG. 5.

Example 5

The same coating process was implemented as in Example 3, but the SAM component was replaced with the SAM from Example 2.

Example 6

Figure 6:
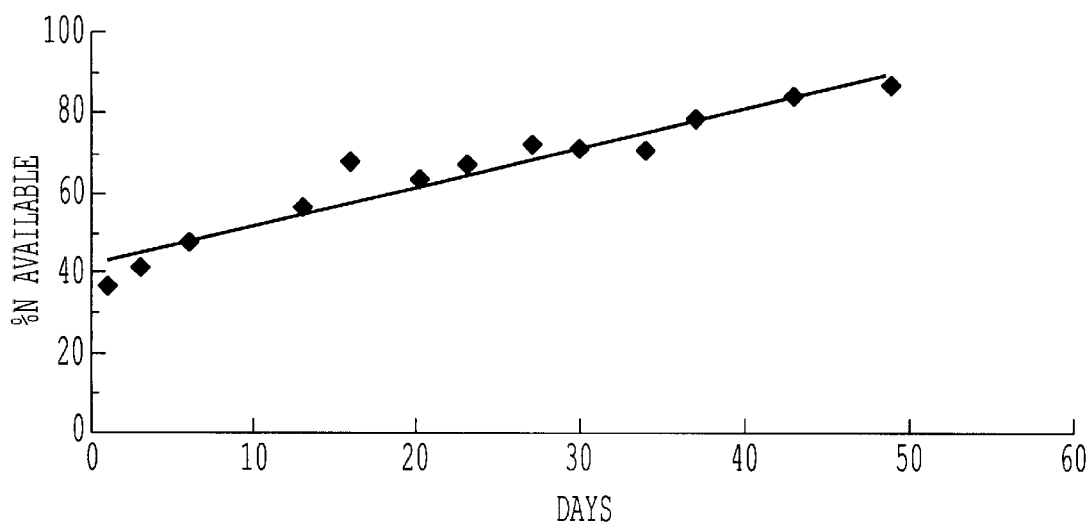
FIG. 6 is a graph of controlled release data obtained in a still further embodiment of the present invention.

The same coating process was implemented as in Example 4, but the SAM component was replaced with the SAM from Example 2. The release pattern obtained, measured using the same procedure desribed in Example 3, is shown in FIG. 6.

Obviously, additional modifications and variations of the present invention are possible in light of the above teachings. It is therefore to be understood that within the scope of the appended claims, the invention may be practiced otherwise than as specifically described herein.

We claim:

1. A controlled release fertilizer comprising:
a nutrient particle having coated thereon a coating comprising molecules of an amphiphilic compound, wherein the amphiphilic compound has a hydrophilic portion and a hydrophobic portion, wherein a plurality of said amphiphilic compound molecules self-assemble to form said coating such that said hydrophilic portion is proximal relative to said nutrient particle and said hydrophobic portion is distal relative to said nutrient particle.

2. The controlled release fertilizer of claim 1, wherein said amphiphilic compound is a compound obtained from reacting unsaturated organic acids and their derivatives with an amine containing compound selected from the group consisting of hydroxylamines, and polyamines or a compound selected from the group consisting of multifunctional alcohols.

3. The controlled release fertilizer of claim 1, wherein said coating further comprises one or more crosslinking agents to provide crosslinking between at least a portion of said amphiphilic compounds.

4. The controlled release fertilizer of claim 3, further comprising one or more catalysts or initiators or both.

5. The controlled release fertilizer of claim 1, wherein said amphiphilic compound is from 0.5 nm to 30 nm in size.

6. The controlled release fertilizer of claim 1, wherein said amphiphilic compound is a member selected from the group consisting of amido polyalcohols, amido polyamines and ester alcohols.

7. The controlled release fertilizer of claim 2, wherein said unsaturated organic acids and derivatives thereof are selected from the group consisting of aromatic and alkyl acids and derivatives thereof.

8. The controlled release fertilizer of claim 7, wherein said unsaturated organic acids and derivatives thereof are a member selected from the group consisting of fatty acids and derivatives thereof.

9. The controlled release fertilizer of claim 8, wherein said fatty acids and derivatives thereof are a member selected from the group consisting of natural oils.

10. The controlled release fertilizer of claim 9, wherein at least one of said natural oils is a member selected from the group consisting of castor oil, linseed oil, soybean oil, sunflower oil, tall oil, and tung oil.

11. The controlled release fertilizer of claim 2, wherein said hydroxylamines are selected from the group consisting of ethanolamine, diethanolamine, propanolamine, and dipropanolamine.

12. The controlled release fertilizer of claim 2, wherein said polyamines are selected from the group consisting of ethylenediamine, diethylenetriamine, triethylenetetraamine, tetraethylenepentaamine, and pentaethylenehexaamine.

13. The controlled release fertilizer of claim 2, wherein said multifunctional alcohols are selected from the group consisting of pentaerythyritol, glycerols and polymeric polyols.

14. The controlled release fertilizer of claim 3, wherein said one or more crosslinking agents are a member selected from the group consisting of isocyanate crosslinking agents, polyvinylethers, polyacrylates, and epoxy compounds.

15. The controlled release fertilizer of claim 14, wherein said isocyanate crosslinking agents are a member selected from the group consisting of aromatic isocyanates and aliphatic isocyanates.

16. The controlled release fertilizer of claim 4, wherein said catalysts, initiators or both are a member selected from the group consisting of peroxide compounds, azo compounds, manganese salts, cobalt salts, zinc salts, zirconium salts, calcium salts and mixtures thereof.

17. The controlled release fertilizer of claim 1, wherein the nutrient particle is a member selected from the group consisting of primary nutrients, secondary nutrients and micronutrients.

18. The controlled release fertilizer of claim 17, wherein said primary nutrients are one or more members selected from the group consisting of N, P, K and their combination products.

19. The controlled release fertilizer of claim 17, wherein said secondary nutrients are one or more members selected from the group consisting of calcium, magnesium and sulfur.

20. The controlled release fertilizer of claim 17, wherein said micro nutrients are one or more members selected from the group consisting of boron, copper, iron, manganese, molybdenum and zinc.

21. The controlled release fertilizer of claim 1, wherein said coating further comprises one or more polyols or polyamines in combination with said amphiphilic compound.

22. The controlled release fertilizer of claim 1, wherein said coating is present in an average amount of from 0.5 wt % to 25 wt % based on total coated nutrient particle.

23. The controlled release fertilizer of claim 1, wherein said nutrient particles are a member selected from the group consisting of urea, ammonium nitrate, diammonium phosphate, monoammonium phosphate, potash, potassium chloride, ammonium sulfate, and potassium sulfate.

24. The controlled release fertilizer of claim 1, wherein said controlled release fertilizer is a mixture of two or more different coated nutrient particles.

25. The controlled release fertilizer of claim 1, further comprising a plurality of coatings, wherein each coating layer may be the same as or different from the other coating layers, wherein said controlled release fertilizer has a controlled release rate of from 2 to 10 months.

26. The controlled release fertilizer of claim 25, wherein said plurality of coatings is a number of layers from 2 to 100.

27. The controlled release fertilizer of claim 1, further comprising a non-coated nutrient composition.

28. The controlled release fertilizer of claim 27, wherein said nutrient particle is a member selected from the group consisting of urea, ammonium nitrate, diammonium phosphate, monoammonium phosphate, potash, potassium chloride, ammonium sulfate, and potassium sulfate.

29. The controlled release fertilizer of claim 27, wherein the non-coated nutrient composition is a member selected from the group consisting of phosphorous fertilizers and potassium fertilizers.

30. A process for preparation of a controlled release fertilizer, comprising:

coating a nutrient particle with a coating comprising molecules of an amphiphilic compound, wherein the amphiphilic compound has a hydrophilic portion and a hydrophobic portion, wherein a plurality of said amphiphilic compound molecules self-assemble to form said coating such that said hydrophilic portion is proximal relative to said nutrient particle and said hydrophobic portion is distal relative to said nutrient particle.

31. The process of claim 30, wherein said coating is performed by spraying or ejecting the coating onto said nutrient particle.

32. The process of claim 31, wherein said nutrient particle is being subjected to tumbling during said spraying or ejecting.

33. The process of claim 30, wherein said coating step is performed a plurality of times to apply a plurality of coating layers.

34. The process of claim 33, wherein said plurality of coating layers are coating layers of identical composition.

35. The process of claim 33, wherein said plurality of coating layers comprise two or more different coating compositions.

36. The process of claim 30, wherein said coating is performed at a temperature of from 60 to 80° C.

37. The process of claim 36, wherein said coating is performed for a time of from 5 to 20 min.

38. The process of claim 30, further comprising crosslinking said coating by curing said coating in the presence of one or more crosslinking agents.

39. The process of claim 38, wherein said crosslinking is performed in the presence of one or more catalysts or initiators or both.

40. The process of claim 38, wherein said one or more crosslinking agents are a member selected from the group consisting of isocyanate crosslinking agents, polyvinylethers, polyacrylates, and epoxy compounds.

41. The process of claim 40, wherein said isocyanate crosslinking agents are a member selected from the group consisting of aromatic isocyanates and aliphatic isocyanates.

42. The process of claim 39, wherein said catalysts, initiators or both are a member selected from the group consisting of peroxide compounds, azo compounds, manganese salts, cobalt salts, zinc salts, zirconium salts, calcium salts and mixtures thereof.

43. A controlled release fertilizer comprising:

a nutrient particle coated by a means for forming a self-assembling molecular coating.

44. A process for production of a controlled release fertilizer, comprising:

a step of coating a nutrient particle with a self-assembling molecular coating.

45. The process of claim 44, further comprising a step of curing said self-assembling molecular coating.

* * * * *

UNITED STATES PATENT AND TRADEMARK OFFICE
CERTIFICATE OF CORRECTION

PATENT NO. : 6,540,808 B2  
DATED : April 1, 2003  
INVENTOR(S) : Zhongxin Ma et al.

It is certified that error appears in the above-identified patent and that said Letters Patent is hereby corrected as shown below:

Column 4,
Line 45, "from 70 to 20°C" should read -- from 70 to 200°C --.

Signed and Sealed this

Sixteenth Day of December, 2003

JAMES E. ROGAN
*Director of the United States Patent and Trademark Office*